United States Patent [19]
MacManus et al.

[11] 3,810,489
[45] May 14, 1974

[54] SOLENOID LATCHED DIAPHRAGM FUEL SHUT-OFF VALVE ASSEMBLY

[75] Inventors: Daniel C. MacManus, Owosso; Carlen E. Larson, Davison; Robert L. Lochmann, Grand Blanc, all of Mich.

[73] Assignee: General Motors Corporation, Detroit, Mich.

[22] Filed: Feb. 5, 1973

[21] Appl. No.: 329,905

[52] U.S. Cl. ............................ 137/495, 137/510
[51] Int. Cl. ............................................ F16k 31/02
[58] Field of Search ............ 137/495, 510; 251/129, 251/130

[56] References Cited
UNITED STATES PATENTS

| 2,982,300 | 5/1961 | Jackson et al. | 137/495 |
| 2,608,353 | 8/1952 | Cobb | 251/130 X |
| 2,212,762 | 8/1940 | Wittmann | 137/495 |
| 3,433,255 | 3/1969 | Cubberley et al. | 137/510 |
| 1,333,681 | 3/1920 | Riley | 251/129 X |
| 2,797,061 | 6/1957 | Buchanan | 251/130 |
| 3,071,147 | 1/1963 | Dudzinski | 137/495 X |
| 3,374,805 | 3/1968 | Trevarrow | 137/495 X |

Primary Examiner—Alan Cohan
Assistant Examiner—Gerald A. Michalsky
Attorney, Agent, or Firm—Paul Fitzpatrick

[57] ABSTRACT

A fuel shut-off valve assembly for a vehicle fuel line comprises a chamber inserted in the fuel line with an inlet port having a spring biased check valve which opens toward the fuel tank and an outlet port open to the low pressure side of the fuel pump. The volume of the chamber is varied by a flexible diaphragm effective to open the check valve when the fuel pump tank operates. A solenoid energized through the engine ignition switch has an armature linked to the supporting brace and valve to help latch the valve open.

2 Claims, 1 Drawing Figure

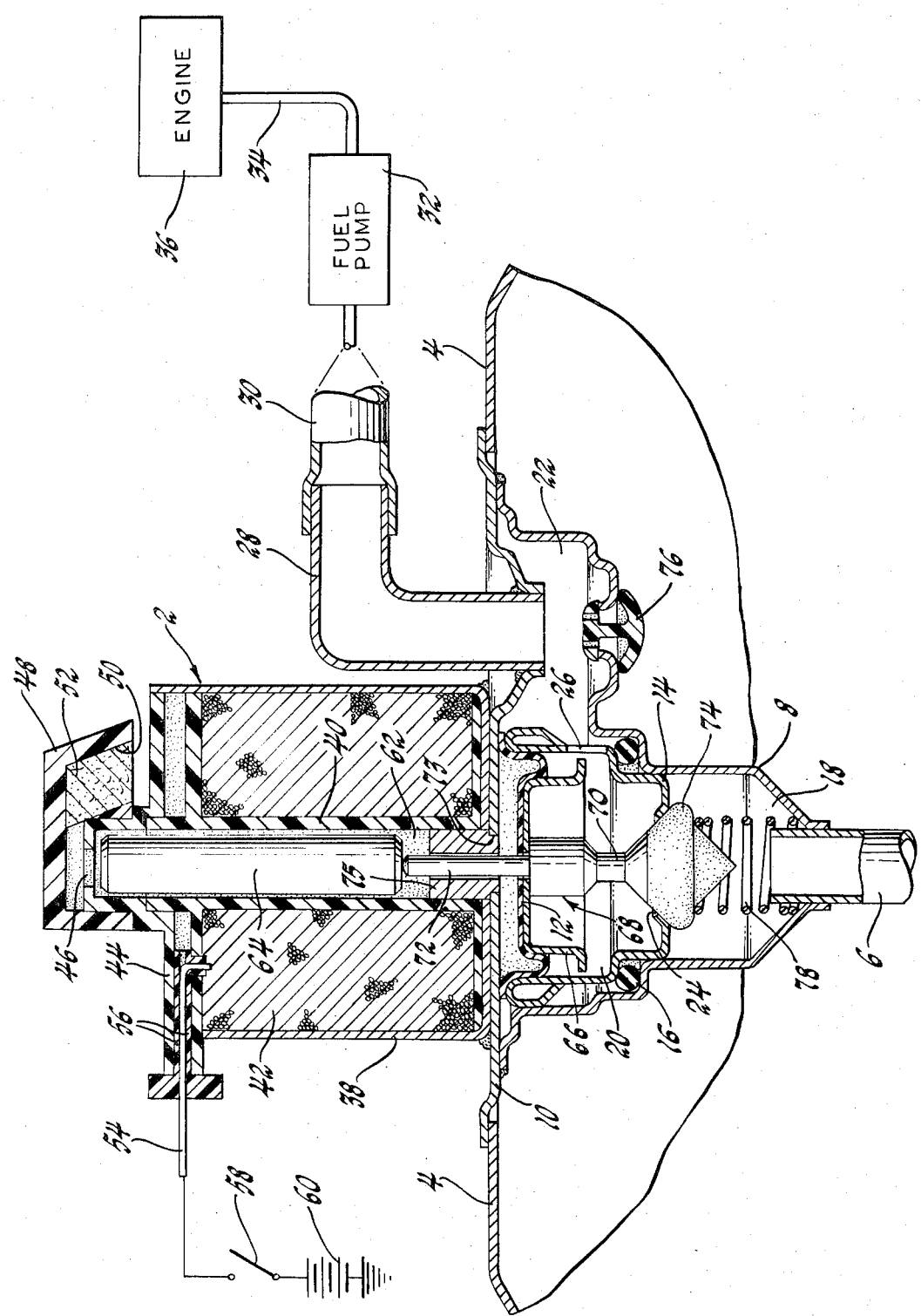

SOLENOID LATCHED DIAPHRAGM FUEL SHUT-OFF VALVE ASSEMBLY

SUMMARY OF THE INVENTION

This invention relates to apparatus for automatically shutting off the flow of fuel from a vehicle fuel tank when the vehicle is not in use. Such apparatus is useful with the type of non-vented fuel tank used to decrease the emission of unburned hydrocarbons from vehicle fuel systems. In an unvented fuel tank, especially in warm weather, the pressure of the vapor above the fuel can build up to a level greater than atmospheric pressure. To prevent this pressure from forcing fuel out of the tank into the fuel line when fuel flow is not desired, a spring biased check valve is contemplated. This valve must have a valve member capable of comparably large travel so that the valve, when open, will contribute minimum restriction to fuel flow through the line.

Two means are contemplated for opening the valve against the spring bias and internal fuel tank pressure. One means comprises a solenoid having an actuating coil connected to a source of electric power through the engine ignition switch and having a magnetically responsive armature effective to push the valve member of the check valve against the spring bias when the solenoid is actuated. However, a solenoid sufficient to reliably actuate the check valve alone is large and expensive.

The other means for actuating the valve member comprises a chamber downstream from the check valve having a movable wall effective to push the valve member of the check valve against the spring bias when fuel pump operation lowers the pressure in the line between the fuel pump and the valve. However, such a chamber and movable wall arrangement has been found, when used alone, to be unstable. The valve member tends to hunt between open and closed positions; and surges of back pressure in the fuel line caused by the fuel pump can aggravate this instability and interrupt the smooth flow of fuel.

A solution to the problems encountered with these two means of opening the check valve is found in their combination. A chamber with a movable wall is provided for the initial opening of the valve; and this allows a smaller solenoid to be used. When the valve is opened by the movable wall, the armature of the solenoid is allowed to move within the coil so that the force exerted by the solenoid on the armature, now at its maximum, is sufficient to latch the valve open and stabilize it in spite of variations in pressure caused by the fuel pump.

Other objects and advantages of this invention will be apparent in the following specification and drawing.

SUMMARY OF THE DRAWING

The drawing is a sectional view of a preferred embodiment of my invention.

DESCRIPTION OF THE PREFERRED EMBODIMENT

Referring to the FIGURE, the fuel shut-off valve assembly, generally referred to as 2, is shown mounted on top of a fuel tank, a portion of whose wall is referred to as 4. The assembly 2 has an inlet tube 6 extending downward into the fuel tank 4. The inlet tube 6 is a standard device which generally extends to the lowest point of the fuel tank so that fuel may be obtained from the tank until it is almost empty. The inlet tube 6 is welded into a lower chamber member 8 which, in turn, is welded to an upper chamber member 10. Between the upper and lower chamber members, the following members are pressed and tightly held, in order from top to bottom; a flexible diaphragm 12, a main chamber member 14, and a sealing ring 16. The main chamber member 14, lower chamber member 8 and sealing ring 16 form an inlet chamber 18 into which the inlet tube 6 opens. The main chamber member 14 and the flexible diaphragm 12 form a housing which defines a main chamber 20. Finally, the main chamber member 14, lower chamber member 8, upper chamber member 10 and sealing ring 16 form an outlet chamber 22. The main chamber member 14 defines an inlet port 24 between the inlet chamber 18 and main chamber 20 and an outlet port 26 between the main chamber 20 and the outlet chamber 22. An outlet tube 28 is welded to the upper chamber member 10 so as to be open to the outlet chamber 22. The outlet tube 28 connects the outlet chamber 22 through a conduit 30 to the fuel pump 32, which pumps fuel through conduit 34 to the engine 36.

Welded to the top of the upper chamber member 10 is a solenoid case 38, which contains a spool 40 on which is wound a coil 42. The top of the solenoid case is closed by an end piece 44 which contains an opening 46. A cap 48 which has an opening 50 and contains the filter 52 in the opening 50, is clamped over the end piece 44 covering the opening 46. A terminal 54, pressed between two insulators 56, is held between the end piece 44 and the spool 40. One end of the coil 42 is connected to the terminal 54 and the other end to the vehicle ground through the solenoid case 38, upper chamber member 10 and fuel tank 4, which are all made of current conducting materials. The terminal 54 is connected through the engine ignition switch 58 to a battery or similar DC power source 60.

The spool 40 and end piece 44 form at their center a long cylindrical passage 62 in which a cylindrical armature 64, made of a magnetically responsive material, is free to move axially. A cylindrical flux member 75, made of a magnetically responsive material, is disposed in the lower axial end of the passage 62 in contact with the solenoid case 38, which is also made of a magnetically responsive material.

Within the main chamber 20, a flat cup-shaped supporting member 66 is positioned just below and in contact with the flexible diaphragm 12. A linking member 68 has a lower portion 70 of a larger diameter below the support membe 66 and an upper portion 72 of smaller diameter projecting through the centers of the support member 66 and flexible diaphragm 12 and an opening 73 in the upper chamber member 10 into the passage 62, where it abuts the armature 64. The upper portion 72 is made of a nonmagnetically responsive material. Mounted on the lower end of the linking member 68 is a valve membe 74 positioned in the inlet port 24. The valve member 74 is made of a resilient material such as rubber and is wider than the inlet port 24 in the inlet chamber 18 and narrower than the inlet port 24 in the main chamber 20. A compression spring 78 is positioned between the lower chamber member 8 and the valve member 74 to bias the valve member 74 upward to close the inlet port 24. A pressure relief valve 76 is included in the lower chamber member 8 to allow fuel under excess pressure in the outlet chamber 22 to escape into the fuel tank 4.

The operation of the device will now be described. The vehicle ignition switch 58 is closed and the engine 36 started. The closure of switch 58 causes the coil 42 to be energized; and the engine causes the fuel pump 32 to begin operating, which produces a decreased pressure within the main chamber 20. With the armature 64 in its upper position, the gap between it and the flux member 75 is large; and the magnetic force exerted on the valve member 74 is not sufficient to fully open it against the spring 78. However, since the upper side of the diaphragm 12 is open to atmospheric pressure through the passage 62 and openings 46 and 50, the reduced pressure within the main chamber 20 allows the diaphragm to move the valve member 74 downward and thus fully open the inlet port 24. The downward movement of the diaphragm allows the armature 64 to move downward against the flux member 75. Since the magnetic force exerted on the armature 64 is now greater, the fuel pressure pulses acting against the diaphragm 12 cannot move the valve member 74 to close the inlet port 24, and the valve member 74 is thus latched in the open position.

When the ignition switch 58 is opened the engine driven fuel pump 32 stops. Since neither the solenoid nor fuel pump suction is present under these conditions, the spring 78 closes the valve member 74 against the inlet port 24. Expansion pressure within the tank cannot force fuel into chamber 20 past the valve member 74; and expansion pressure within chambers 20 or 22 is relieved through the pressure relief valve 76 into the fuel tank 4. The fuel is thus kept within the fuel tank 4 when the vehicle is not being used.

We claim:

1. A valve assembly for an engine fuel line including a fuel pump comprising, in combination:
   a valve in the fuel line having a closed position and an open position;
   spring means biasing the valve to its closed position;

an expansible chamber motor actuable by the suction of the fuel pump to move the valve against the spring bias to its open position;
   a source of electric power;
   a solenoid assembly including an armature and a coil, the armature abutting the valve for co-movement therewith and defining a first position when the valve is in its closed position and a second position when the valve is in its open position, the coil being actuable by the electric power source to exert a magnetic force on the armature biasing the armature against the valve and opposing the spring bias, the magnetic force with the armature in its first position being less than that required to move the valve against the spring bias, the magnetic force increasing, as the armature moves from its first to its second position, by a greater amount than the spring bias increases as the valve moves from its closed to its open position to such an extent that the spring bias with the valve in its open position is less than the force required to move the valve to its closed position against the magnetic force.

2. A fuel shut-off valve assembly for use with an engine having an engine driven fuel pump, a fuel tank containing fuel for the engine, a source of electric power and a switch, the fuel shut-off valve assembly comprising, in combination:
   a housing with a movable wall, the housing defining a chamber having an inlet port connectable with the fuel tank for the admittance of fuel therefrom and an outlet port connectable to the fuel pump, the movable wall being actuable by decreased pressure within the chamber to move inward in the chamber when the outlet port is so connected and the fuel pump is driven;
   a valve in the inlet port, the valve defining a closed position for blocking fuel flow through the inlet port and an open position for allowing fuel flow through the inlet port, the valve being linked to the movable wall for co-movement therewith from its closed position to its open position when the movable wall is actuated;
   a spring biasing the valve toward its closed position;

a solenoid attached to the chamber, the solenoid including a coil and an armature, the armature being adapted to be forced to a first position by the valve when the valve moves to its closed position and being free to move with the valve to a second position when the valve moves to its open position, the coil being connectable to the electric power source through the switch for energization when the switch is closed, the coil being effective to exert a magnetic force on the armature biasing the armature toward its second position, the magnetic force with the solenoid in its first position being less than that required to move the valve from its closed position against said spring bias, the magnetic force increasing as the armature moves from its first position to its second position upon actuation of the movable wall, the increase in magnetic force being greater than the increase in the bias of the spring as the valve moves from its closed position to its open position by such an amount that the bias of the spring is less than that required to move the valve from its open position to its closed position against the magnetic force.

\* \* \* \* \*